UNITED STATES PATENT OFFICE.

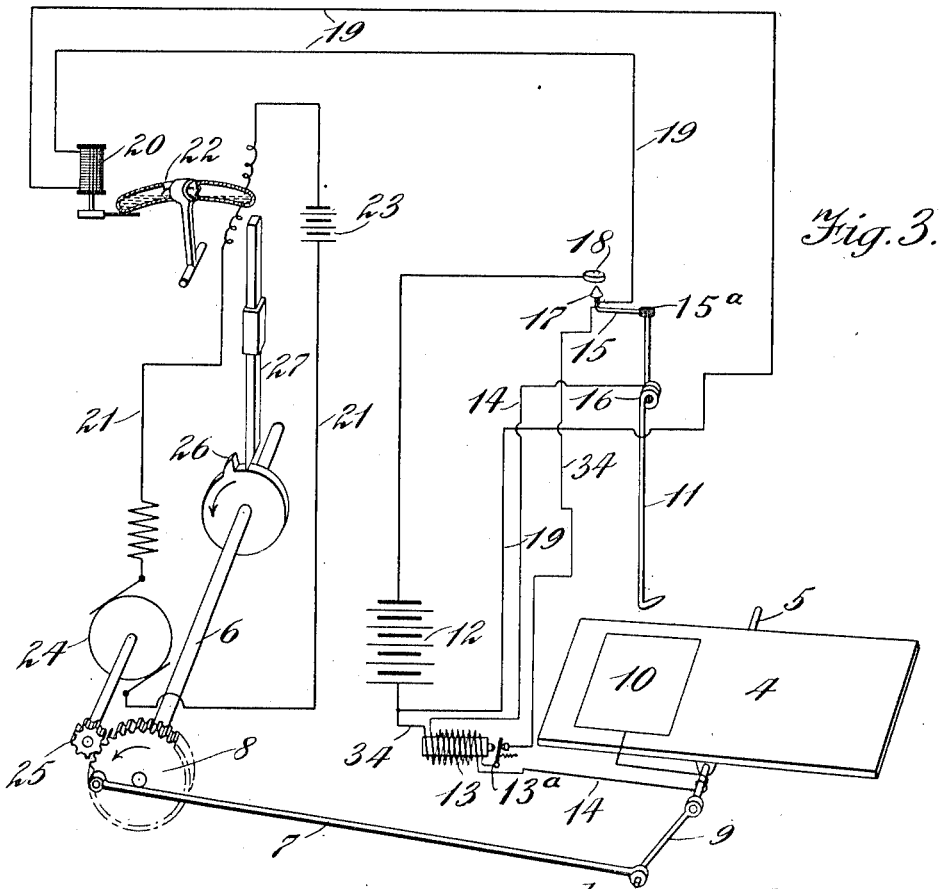
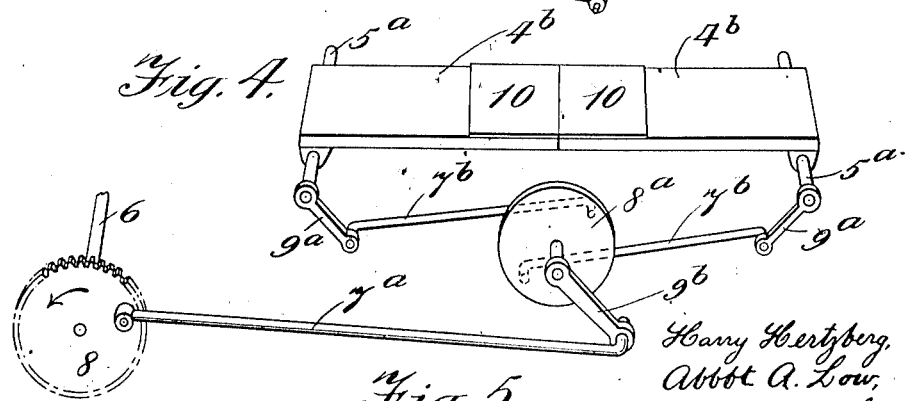
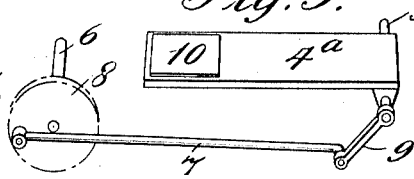

HARRY HERTZBERG, OF NEW YORK, ABBOT A. LOW, OF HORSESHOE, AND MAURICE J. WOHL, OF NEW YORK, N. Y., ASSIGNORS TO SAID ABBOT A. LOW, MAURICE J. WOHL, AND HARRY HERTZBERG, TRUSTEES.

ELECTROCUTING-TRAP.

1,001,400.  Specification of Letters Patent.  Patented Aug. 22, 1911.

Application filed August 10, 1909. Serial No. 512,122.

*To all whom it may concern:*

Be it known that we, HARRY HERTZBERG, ABBOT A. LOW, and MAURICE J. WOHL, citizens of the United States, and residents, respectively, of the city of New York, borough of Brooklyn, county of Kings, and State of New York; of Horseshoe, St. Lawrence county, State of New York, and of the city, county, and State of New York, have invented certain new and useful Improvements in Electrocuting-Traps, of which the following is a specification.

This invention relates to traps, and the object is first to electrocute the animal and then to cause it to be deposited in a receptacle, preferably containing water, where the animal will drown if life be not extinct.

The trap will be useful as a mouse-trap and for other kinds of animals.

Briefly described, the invention may be said to comprise a trap-door, an electrocuting circuit having one electrode on said door and the other adjacent thereto, and means for actuating said trap-door when the electrocuting charge is passed through the animal.

Other features and phases of the invention will become apparent as the specification proceeds.

Figure 1:
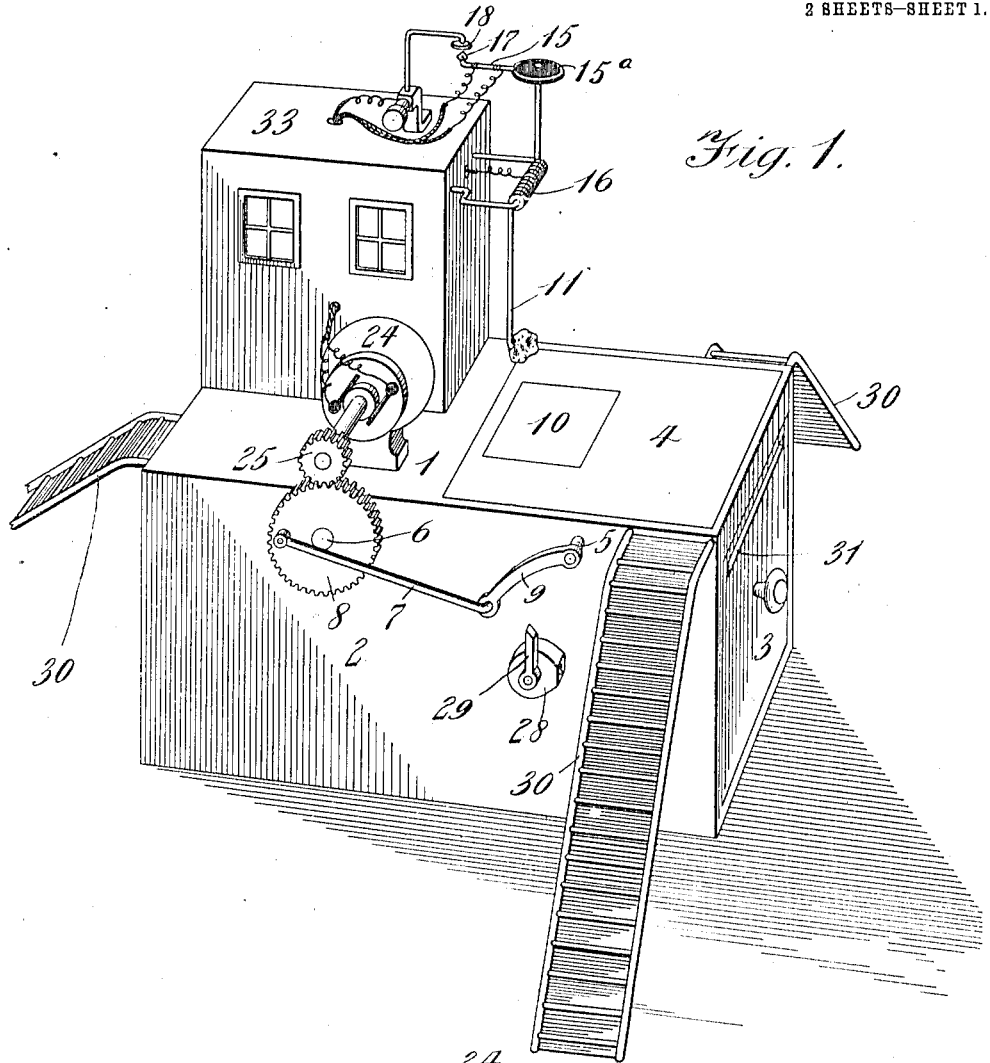
Figure 2:
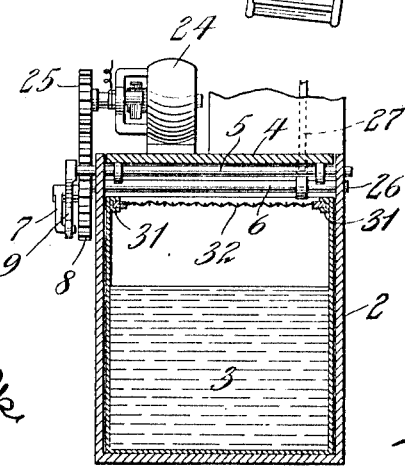

In the accompanying drawings, illustrating what is regarded as a suitable embodiment of the invention, Figure 1 is a perspective view of the trap, Fig. 2 is a vertical transverse section, Fig. 3 is a diagrammatic view showing one system of wiring, and Figs. 4 and 5 are detail perspectives showing two other ways of mounting the trap-door.

Referring to these views, the numeral 1 indicates a platform, which may or may not, be elevated. It is shown as forming the top of a box 2, having a drawer or receptacle 3, preferably zinc-lined, for holding water. However, the liquid-receptacle might be at some distance below the platform 1, as beneath the floor of the room in which the trap is located. In the several views, 4, 4$^a$, 4$^b$, indicate different forms of trap-door mounted in the platform 1.

Figs. 1 to 3 show a single trap-door pivotally supported intermediate its length, as on an oscillatory shaft 5; the said shaft being actuated by a rotary shaft 6, through a link 7 and a crank 9. The said link may be pivoted at one end eccentrically to a gear 8 carried on the shaft 6 and at the other end to the crank 9 on the oscillatory shaft 5. By reason of the relation of the crank arms, a complete revolution of the shaft 6 will tilt the trap-door 4, and then restore it to normal position. Fig. 5 shows a trap-door similarly mounted and actuated, except that the door is pivoted at its rear end.

Fig. 4 shows a double trap-door 4$^b$, the two parts of which are supported pivotally at their remote ends on oscillatory shafts 5$^a$, having cranks 9$^a$. The cranks 9$^a$ are connected by links 7$^b$ with a disk or double crank 8$^a$, having a crank 9$^b$ connected with the gear 8 by a link 7$^a$. It will be obvious that the trap-door may be mounted and operated in a variety of ways.

The trap-door, 4, 4$^a$ or 4$^b$, carries an electrode, preferably in the nature of a metal plate 10. Located adjacent this electrode 10, and preferably constituting a bait-holder thereover, is the other electrode 11 of the electrocuting circuit 14, which may be in series with the secondary winding of the induction coil 13. Preferably, this bait-holder 11, when moved by the animal in nibbling at the bait, closes a normally-open circuit-breaker 15. A convenient arrangement is to suspend the bait-holder 11 pivotally, as at 16; the contact portion 17 thereof being normally held away from the fixed contact 18 by the force of gravity. This circuit-breaker 15, in the preferable arrangement, is insulated from the bait holder 11 and electrocuting circuit 14 by the insulating portion 15$^a$ and is common both to the circuit 34 of the primary winding of the coil 13, and to a circuit 19, both of which may be supplied by a battery 12. Circuit 19 is in series with an electro-magnet 20. The said electro-magnet, when energized, completes a circuit 21, as by tilting a mercury circuit-breaker 22. The circuit 21, supplied from any source, as a battery 23, is in series with a motor 24, the shaft of which carries a gear 25, meshing with the gear 8. When the shaft 6 and gear 8 have completed a revolution, means actuated thereby, as a cam 26 and a vertical push-rod 27, restore the mercury circuit-breaker to normal position, that is, with the circuit 21 open. It will be obvious, however, that the invention is not limited to the precise manner of actuating the trap-door.

When the animal stands upon the plate 10 and touches the bait-holder 11, it completes the secondary or electrocuting circuit 14. When it moves the bait-holder so as to close the circuit-breaker 15, it completes the primary circuit 34 through the coil 13 and its make and break magnetic circuit breaker 13ᵃ and receives the electric shock through its body, and at the same time causes the trap-door to be actuated.

A counter or register of any suitable or well-known construction is indicated at 28, having an operating part 29 in position to be actuated by the trap-door mechanism, as by the end of the link 7 contacting therewith. Thus, the number of animals caught may be learned at a glance.

Any suitable means, as inclines 30, may be provided for enabling the mice or other animals to gain the platform 1.

The receptacle or drawer 3 is preferably provided near the top and through its front with horizontal guides 31, in which may be inserted a slide 32, for preventing the escape of any living animals from the open top of the receptacle when the latter is removed from the box 2. It is desirable, but not necessary, that this slide be of foraminous material, so that the contents of the drawer may be viewed therethrough. Of course, this slide is not in place when the trap is in use.

As much of the electrical apparatus and mechanical actuating parts as may be desired may be inclosed, as in a superstructure 33.

What is claimed as new is:

1. In a trap, a trap-door, an induction coil, an electrocuting circuit in series with the secondary of said coil, having one electrode on said trap-door and the other adjacent thereto, the latter electrode constituting a movable bait-holder, a circuit and means operable thereby to actuate said trap-door, and a circuit breaker common to the latter circuit and to the primary circuit of said induction coil, said circuit-breaker being normally open and adapted to be closed by said bait-holder.

2. In a trap, a trap-door, an induction coil, an electrocuting circuit in series with the secondary of said coil, having one electrode on said trap-door and the other adjacent thereto, the latter electrode constituting a movable bait-holder, a circuit and means operable thereby to actuate said trap-door, and a normally-open circuit-breaker carried by said bait-holder, said circuit-breaker being common to the last-named circuit and to the primary circuit of said induction coil.

3. In a trap, an oscillatory trap-door, an electrocuting circuit having one electrode on said trap-door and the other adjacent thereto, a normally-open circuit, means for closing said circuit when the electrocuting current is passed through an animal on said trap-door, said means including an electromagnet and a circuit-breaker adapted to be closed thereby, a motor in said normally-open circuit, a shaft adapted to be driven by said motor, connection between said shaft and said trap-door whereby one revolution of said shaft causes said trap-door first to tilt and then to be restored to normal position, and cam mechanism whereby said shaft re-opens said circuit breaker after one revolution.

Signed at Brooklyn, N. Y., in the county of Kings, and State of New York, this 20th day of July, 1909.

HARRY HERTZBERG.
ABBOT A. LOW.
MAURICE J. WOHL.

Witnesses:
H. C. CZIESLIK,
GEO. WELLING GIDDINGS.